No. 869,808. PATENTED OCT. 29, 1907.
P. B. SHEE.
CENTRIFUGAL SEPARATOR BOWL.
APPLICATION FILED APR. 30, 1906.
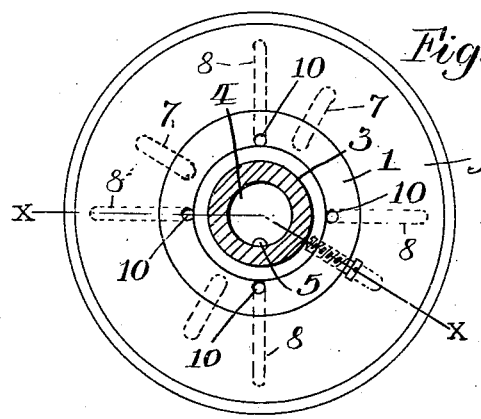
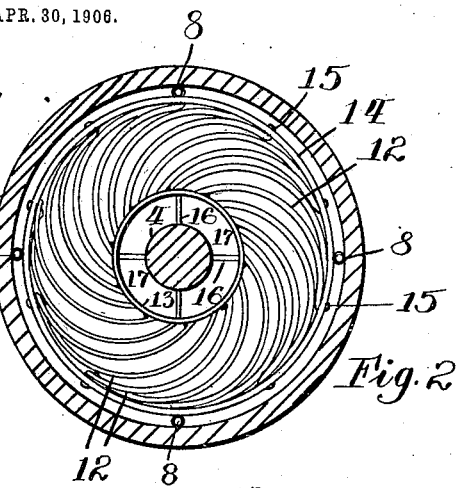
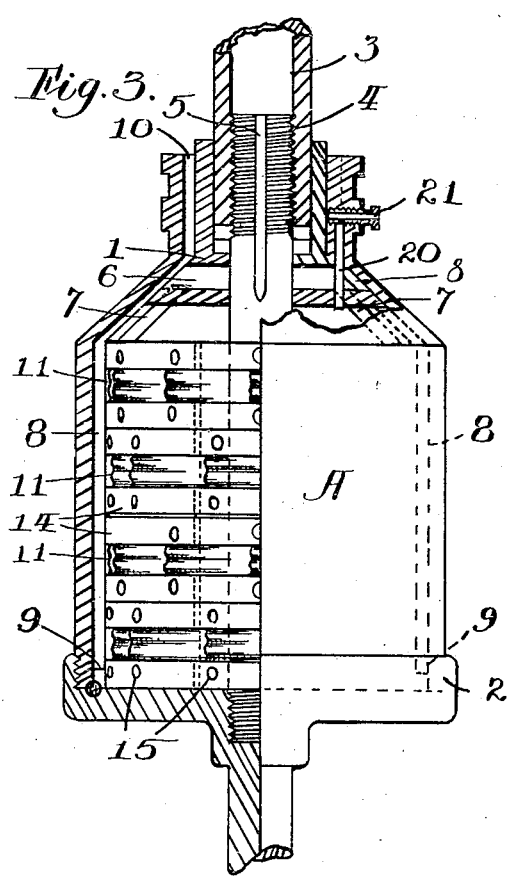
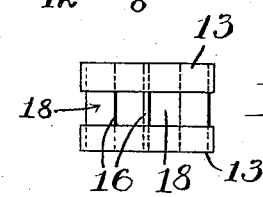
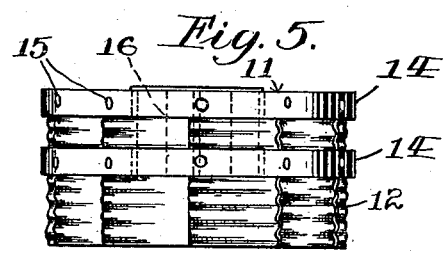
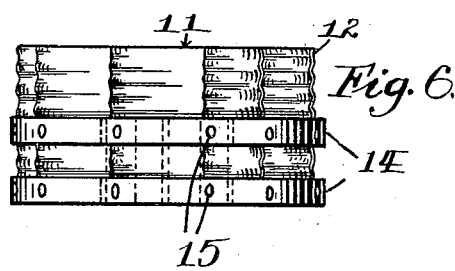
Witnesses:
Inventor:
Parke B. Shee,
by: John E. Stryker
Attorney.

UNITED STATES PATENT OFFICE.

PARKE B. SHEE, OF ST. PAUL, MINNESOTA, ASSIGNOR OF ONE-HALF TO JAMES D. DENEGRE, OF ST. PAUL, MINNESOTA.

CENTRIFUGAL SEPARATOR-BOWL.

No. 869,808.  Specification of Letters Patent.  Patented Oct. 29, 1907.

Application filed April 30, 1906. Serial No. 314,514.

*To all whom it may concern:*

Be it known that I, PARKE B. SHEE, a citizen of the United States, residing at St. Paul, in the county of Ramsey and State of Minnesota, have invented a new and useful Improvement in Centrifugal Separator-Bowls, of which the following is a specification.

My invention relates to improvements in centrifugal separator bowls and more particularly to that class having separable radial sections.

It has for its object the efficient separation of whole milk into its component liquids, cream and skimmed milk.

Other advantages are ease in cleaning and the elimination of unnecessary wearing surfaces.

In the accompanying drawings forming part of this specification, Figure 1 is a horizontal plan view of my separator bowl; Fig. 2 is a central horizontal section of the same, showing the separable sections in place; Fig. 3 is a vertical section of the bowl, taken on the line X—X of Fig. 1, a portion of the bowl being shown in full; Fig. 4 is a detail showing the arrangement of the inner bands; Fig. 5 is a perspective view of one of the separable sections, and Fig. 6 is a similar view of a second separable section whose blades are adapted to alternate between those shown in Fig. 5.

A is a centrifugal bowl, which may be journaled in the frame of a separator (not shown) in any desired manner. A top 1 and a bottom 2 are attached to the bowl by any suitable means. The feed inlet for the whole milk is through the central vertical tube 3, which is threaded upon a center bolt 4. The latter is provided with a vertical groove 5 (for the passage of the milk) opening into a groove 6 in the top 1, which in turn connects with a tube 7 fastened in the bowl. From the tube 7 the whole milk is delivered into the central cavity of the bowl and is distributed for separation between the corrugated blades hereinafter described. The bowl is also provided with fixed tubes 8 along its peripheral surfaces, which have inlets 9 near the bottom of the bowl and outlets 10 into the skimmed milk cover above the bowl. These tubes furnish the means of egress for the skimmed milk after separation, as hereinafter described, Separable sections 11, provided with curved and corrugated blades 12, are adapted to fit loosely into the bowl. I prefer to use four of these sections. The blades 12 of the sections are soldered to central bands 13 at their inner extremities and attached to outer bands 14 by rivets 15. Flanges 16 are attached radially to the inside of the inner bands 13, these flanges being of sufficient length to form at their inner extremities suitable bearings upon the center bolt 4 of the bowl. The blades of the two upper divisions are adapted to fit between each other, so that when in place the blades of one alternate with those of the other. Two of the separable sections 11 are shown in Figs. 5 and 6 in position to be fitted together by passing the blades 12 of Fig. 5 between the blades 12 of Fig. 6. When the blades are so placed, the lower bands of the upper section rest upon the upper bands of the section immediately below. The two lower divisions when in place bear a similar relation to each other. When the sections are so nested in the bowl, the flanges 16, together with the center bolt 4 and bands 13, form vertical passageways 17 in the center of the bowl for the upward flow of the cream. The cream finds its way into these passageways through openings 18 between the central bands 13. In other words, the vertical, cylindrical cavity shown in the drawings between the center bolt 4 and the central bands 13 is divided by the flanges 16 into four parts, and, because the height of the flanges 16 is greater than that of the bands 13 to which they are attached, openings are left between said bands through which the cream in the zone outside these bands flows into the vertical passageway 17. It is obvious that the various vertical passageways and openings in the central cavity of my bowl are continuous but sectional and without horizontal plates or partitions between the blades or elsewhere. The upper extremities of the passageways 17 open into the upper portion of the bowl, from which a tube 20 leads the cream to a hollow screw 21. This screw serves the usual purpose of an outlet tube and also regulates the density of the cream. As is well-known, after the delivery of the whole milk into a revolving bowl, the combined effect of gravity and the centrifugal force results in the flow of the cream toward the center and upward, while the skimmed milk flows downward and outward. Following this law, the whole milk in my separator bowl having been distributed between the corrugated blades the cream, as above stated, is forced to the center through the openings 18 and then upward in the passageway 17. The heavier skimmed milk, on the other hand, flows downward and outward toward the circumference of the bowl until it is below the inlets 9 in the fixed tubes 8, thence, following the lines of least resistance it is forced up these tubes and through the outlets 10 into the skim-milk cover.

Having described my invention, what I claim as new and desire to protect by Letters Patent, is:—

1. A centrifugal separator bowl provided with a plurality of separable sections comprising corrugated blades curved horizontally, central and peripheral bands connecting the blades at their inner and outer extremities, said blades upon each section being deeper than the bands and when in place in the bowl, projecting between those of an adjoining section.

2. A centrifugal bowl provided with a plurality of separable sections, each section comprising inner and outer bands, and curved blades connected by said bands, the blades being of greater width than the bands and extending on one side beyond them so that when the sections are in place within the separator bowl the blades of one section project between the corresponding blades upon an adjoining section.

3. A centrifugal bowl provided with a plurality of separable sections, each section comprising curved blades connected medially and on one side by circular bands so that when the sections are arranged in pairs within the separator bowl the blades of one section will project between and alternate with the corresponding blades upon an adjoining section.

4. A centrifugal separator bowl, provided with a liner composed of a plurality of detachable sections resting one upon another, each section comprising curved blades adapted to alternate with, and pass between corresponding blades upon an adjoining section, and an open frame consisting of bands and vertical flanges for connecting the blades of the respective sections.

5. A centrifugal separator bowl, provided with a plurality of separable sections each consisting of curved corrugated blades which respectively project between the corresponding blades of an adjoining section, and peripheral bands for supporting the blades, the lower band of one section being adapted to rest upon the upper bands of an adjoining section whereby continuous vertical passageways are formed between the blades.

6. A centrifugal separator bowl comprising a center bolt, a plurality of separable sections consisting of corrugated blades, central bands attached thereto and provided with inwardly projecting vertical flanges, outer bands uniting said blades at their peripheral extremities, the central bands being narrower than the flanges or blades so that when said sections are fitted one upon another vertical passageways are formed in the center of the bowl and the blades of one section pass between those of an adjoining section.

7. A centrifugal bowl provided with a center bolt, a plurality of separable sections, each section comprising curved blades united by central and outer bands, the inner side of said central bands being furnished with radial, vertical flanges deeper than the bands, extending substantially to the center bolt and subdividing the inner cavity of the bowl, formed by the central bands and bolt, into vertical passageways connected with the outer cavity of the bowl.

8. A centrifugal bowl provided with a center bolt and a plurality of separable sections each section comprising curved blades united by central bands, the inner side of said central bands being furnished with vertical flanges deeper than the central bands, said center bolt, bands and flanges forming inner conduits for the upward passage of the cream, in combination with vertical tubes attached to the periphery of the bowl adapted to form conduits for the upward passage of the skimmed milk.

In testimony whereof I have signed my name to this specification in the presence of two subscribing witnesses.

PARKE B. SHEE.

Witnesses:
H. H. FLOR,
ELSIE M. BOESEL.